United States Patent [19]

Mardirossian

[11] Patent Number: 5,896,255
[45] Date of Patent: Apr. 20, 1999

[54] MAGNETIC DISC CARTRIDGE AND CORRESPONDING SYSTEM/METHOD FOR LIMITING COPING OF SOFTWARE

[75] Inventor: Aris Mardirossian, Germantown, Md.

[73] Assignee: Aris Mardirossian, Inc., Gaithersburg, Md.

[21] Appl. No.: 08/815,505

[22] Filed: Mar. 12, 1997

Related U.S. Application Data

[63] Continuation-in-part of application No. 08/537,404, Oct. 2, 1995, Pat. No. 5,636,096.

[51] Int. Cl.⁶ ................... G11B 23/03; H04L 9/32
[52] U.S. Cl. ................ 360/133; 380/4; 380/23; 395/188.01
[58] Field of Search ........................ 360/133, 132, 360/60; 380/3, 4, 23, 25; 395/188.01

[56] References Cited

U.S. PATENT DOCUMENTS

| | | | |
|---|---|---|---|
| 3,612,774 | 10/1971 | Wiklund | 360/132 |
| 4,325,089 | 4/1982 | Hsu | 360/15 |
| 4,656,548 | 4/1987 | Pfefferkorn et al. | 360/132 |
| 4,660,116 | 4/1987 | Westfall et al. | 360/132 |
| 4,757,534 | 7/1988 | Matyaj et al. | 380/25 |
| 4,791,565 | 12/1988 | Dunham et al. | 364/200 |
| 4,796,220 | 1/1989 | Wolfe | 364/900 |
| 4,802,048 | 1/1989 | Perkins et al. | 360/132 |
| 4,815,032 | 3/1989 | Fujii | 364/900 |
| 4,847,718 | 7/1989 | Miller et al. | 360/132 |
| 4,849,836 | 7/1989 | Kachikian | 360/60 |
| 4,853,676 | 8/1989 | Kitts | 340/543 |
| 4,866,769 | 9/1989 | Karp | 380/4 |
| 4,926,388 | 5/1990 | Kunita et al. | 365/244 |
| 4,959,861 | 9/1990 | Howlette | 380/4 |
| 4,975,898 | 12/1990 | Yoshida | 369/100 |
| 4,980,782 | 12/1990 | Ginkel | 360/60 |
| 5,023,741 | 6/1991 | Conti et al. | 360/132 |
| 5,053,893 | 10/1991 | Hayata et al. | 360/66 |
| 5,057,947 | 10/1991 | Shimada | 360/60 |
| 5,072,431 | 12/1991 | Ohmori et al. | 369/13 |
| 5,083,224 | 1/1992 | Hoogendoorn et al. | 360/60 |
| 5,109,413 | 4/1992 | Comerford et al. | 380/4 |
| 5,121,380 | 6/1992 | Fujita et al. | 369/291 |
| 5,134,496 | 7/1992 | Schwab et al. | 358/335 |
| 5,159,182 | 10/1992 | Eisele | 235/492 |
| 5,199,066 | 3/1993 | Logan | 380/4 |
| 5,210,795 | 5/1993 | Lipner et al. | 380/23 |
| 5,267,311 | 11/1993 | Bakhoum | 380/4 |
| 5,282,247 | 1/1994 | McLean et al. | 380/4 |
| 5,375,243 | 12/1994 | Parzych et al. | 395/725 |
| 5,559,505 | 9/1996 | McNair | 340/825.31 |
| 5,590,192 | 12/1996 | Lovett et al. | 380/4 |
| 5,592,550 | 1/1997 | Davis et al. | 380/5 |
| 5,594,227 | 1/1997 | Deo | 235/380 |
| 5,594,319 | 1/1997 | Thandiwe | 320/2 |
| 5,636,096 | 6/1997 | Mardirossian | 360/133 |
| 5,675,321 | 10/1997 | McBride | 340/568 |
| 5,715,313 | 2/1998 | Tsukuda et al. | 380/22 |

*Primary Examiner*—William J Klimowecz
*Attorney, Agent, or Firm*—Joseph A. Rhoa

[57] ABSTRACT

A disc cartridge and corresponding method/system are provided for limiting the number of copies which may be made of software stored on a magnetic disc. A magnetic field generating member is provided within a magnetic disc cartridge, or embedded within a magneto-optical or magnetic disc, so that after copying of the software from the first disc to a second disc, the magnet is energized so as to create an erasing magnetic or electromagnetic field proximate the first disc in order to erase the copied software therefrom, while an anti-copy signal is copied or otherwise sent along with the software from the first disc to the second disc so as to prevent later copying of the software from the second disc. According to certain other embodiments of this invention, a method/system is provided for erasing software from a disc using the above-discussed cartridge after a user attempting to copy the software enters an incorrect password a predetermined number of consecutive times.

7 Claims, 6 Drawing Sheets

MAGNETIC DISC CARTRIDGE AND CORRESPONDING SYSTEM/METHOD FOR LIMITING COPING OF SOFTWARE

This application is a continuation-in-part (CIP) of U.S. Ser. No. 08/537,404, filed Oct. 2, 1995, now U.S. Pat. No. 5,636,096, the disclosure of which is incorporated herein by reference.

This invention relates to a magnetic disc cartridge and corresponding system/method for limiting the number of times copies may be made of software stored on a magnetic disc. More particularly, this invention relates to a magnetic disc cartridge including a magnet connected thereto for creating a magnetic field proximate the disc so as to erase the software from the disc after it has been copied a predetermined number (e.g. one) of times.

BACKGROUND OF THE INVENTION

With the tremendous increase in the number of home personal computers (PCs), as well as business PCs, currently in use, there has been a corresponding increase in computer software or programs for use with such PCs. For example, specialized application programs have been developed for everything from presenting elaborate spread sheets and desktop publishing to sophisticated computer games. In general, such application programs (or other confidential or secretive software) are sold to the end user either directly by the individual or company which developed the program, or through an established distribution network which may include mail order and/or retail sales outlets. In many cases, such programs (i.e. software) are stored on a standard magnetic disc within a supporting disc cartridge to facilitate loading of the software onto a PC hard drive for performing the desired tasks.

Control of such software, particularly confidential and/or valuable software distributed on discs, has become a problem due to the ease with which a program stored on such a disc may be duplicated. Although, in theory, copyright laws protect software developers from unauthorized copying of such programs, it is impractical, if not impossible, for software developers to fully enforce their copyrights, particularly against companies or individuals making a relatively small number of copies of such software. For example, a small company may purchase a single copy of original software from the developer and may then produce four or five unauthorized copies of the purchased software for separate use on computers or other PCs at different locations within the company. Likewise, a group of individuals may combine their money to purchase a single original of the software for a particular computer game, for example, and then make a number of unauthorized copies for separate use of the software by each of the individuals within the group on their own computers. In either event, it is difficult for the developer or owner of the original software to enforce the copyright.

Various methods have been developed to prevent unauthorized copying of software. One such method involves requiring the purchaser of the software to enter into a license agreement which permits use of the software only upon a single designated computer and prohibits the purchaser from making unauthorized copies. This form of protection is difficult and expensive to enforce, particularly when dealing with a large member of small companies and individuals.

A second form of protection requires utilizing a secret code or password which must be obtained from the software supplier and entered when using the software. While this form of protection has merit, it still does not preclude unauthorized use or copying on a relatively small scale since the code or password may be obtained by one person from the software supplier and then easily given to others within a small company or a group.

A third form of protection involves placing restrictions within the computer program itself which completely preclude copying or permit only a single copy of the program or software to be made. One problem with this type of protection used as a sale means of protection is that such restrictions within the computer program which completely preclude copying prevent the purchaser from copying the software onto his/her PC hard drive or even making a single backup copy, as permitted by law. Additionally, restrictions in programs which permit only a single copy of the program to be made are problematic in that specialized programs have been developed to circumvent or override this type of protection. Such program restrictions are susceptible to being broken or avoided so that multiple copies may then be made.

U.S. Pat. No. 4,325,089 discloses a system for safeguarding magnetically recorded data in which sensors are provided for generating destruct signals responsive to attempts to gain unauthorized access to the data (software). A control circuit responds to the destruct signals for energizing an electromagnet simultaneously with rotation of the turntable so that the disc is carried through the electromagnetic field created by the magnet for erasing the data. In such a manner, the software stored on the disc is destroyed or erased in response to unauthorized attempts to gain access to the software (e.g. any attempt to break into the housing or even to bodily carry the housing away). Unfortunately, the system of the '089 patent is undesirably bulky and does not provide for limiting the number of copies which may be made of the software to a predetermined number. Additionally, this system may result in the software being unintentionally erased or destroyed before it is ever used by the rightful user.

U.S. Pat. No. 4,975,898 discloses a method and apparatus for preventing copying of an optical disc. In the system of the '898 patent, a standard program and an erasing program are non-rewritably recorded optically on a predetermined region of a disc. The erasing program attempts to erase the non-rewritable standard software portion upon use, this attempt having no effect on the original disc, but will, in fact, erase the standard software portion on a disc which is copied. Thus, if the software and the basic data for executing the program are copied without authorization, the copied disc is prevented from being used because if it is used, the copied standard software will be erased by the copied erasing program. Unfortunately, the system of the '898 patent does not provide a way in which to limit the number of copies made of the software stored on the original disc. Additionally, it is not beyond the realm of possibilities that the erasing program on the original disc may be disabled, circumvented, or rendered useless, in which case, there is no limit upon the number of copies which may be made of the original software, authorized or unauthorized.

U.S. Pat. No. 4,660,116 discloses a video tape cassette with an internal tape erasing system designed to erase data from the tape as it is wound onto the takeup reel, thereby providing for one time viewing only of the prerecorded material. Unfortunately, the system of the '116 patent is designed for use with a video tape cassette and may not be used in conjunction with discs, which are more prevalent in current computer systems. Also, unintentional erasure of data may easily occur with such a desire.

U.S. Pat. No. 5,057,947 discloses a system for limiting the number of copies which may be made of material from a digital audio tape. Again, many tape erasing/destroying systems are not applicable to magnetic disc technology. Furthermore, inhibiting copying by way of software or hardware is not as efficient as simply erasing or destroying the material from the original disc after copying.

U.S. Pat. No. 4,849,836 discloses a system for preventing copying of software from computer discs, the system including a key sequence in a copy protection section of a program which is deliberately rendered ambiguous by repeatedly recording a word containing that sequence while gradually shifting the phase of the transition of a portion of the sequence until the sequence becomes a different sequence. This gradual phase shift cannot be reproduced if the disc is copied onto a standard PC so that the inconsistency on successive readouts will not be present in use via a copied disc. The program is designed so that it cannot run unless inconsistencies are detected in successive readouts in the copy protection section of the program. Again, such software based copy prevention techniques both 1) prevent copying a single time from one disc to another; and 2) are not as efficient as simply erasing the software after a predetermined number of acceptable copies have been made.

U.S. Pat. No. 4,866,769 discloses a copy protection system for PC software distributed on discs which provides a unique ID stored in a RAM of a PC in which software on a disc is to be used. This ID is accessible to the user of the computer. Prior to each use of the program, the software on the disc uses the PC and the source IDs and checkword to verify that the software is being used on the same PC on which it was installed. Unfortunately, authorized users often must switch PCs or use a backup copy or the like on another PC.

U.S. Pat. No. 5,199,066 discloses a method and apparatus for protecting software in which the use of software is enabled only when a predetermined intermediate code and a predetermined software code are identical. Again, this is a software based method of protection which is both expensive to produce and maintain, and is susceptible to being overcome.

FIG. 1 is a top elevational view of prior art magnetic disc cartridge 1 encasing disc 3. FIG. 2 is a front elevational view of cartridge 1 as viewed from the front or shutter edge of the cartridge. Cartridge 1 includes a housing or case made from synthetic resin which includes lower case or half 4 and upper case or half 5. Cartridge 1 rotatably houses and encases magnetic disc 3. Shutter 7 is slidably provided along the front edge side of cartridge 1 so as to open and close head insert opening 9 upon insertion and removal of cartridge 1 into and from a conventional computer (i.e. PC) respectively.

Head insert opening 9 defined within the cartridge body is opened by movement of shutter 7 when the cartridge is inserted into a computer due to the presence of rectangular aperture 11 defined in the body of the shutter, apertures 9 and 11 being aligned so as to open head insert opening 9 when the shutter is forced to the right as shown in FIG. 1 so that the head within the computer may access disc 3. Spring 13 including ends 15 and 17 is provided within the cartridge so as to engage shutter 7 thereby biasing the shutter toward the closed position when the cartridge is outside of the computer as shown in FIG. 1. At the center of cartridge 1, center opening 19 is provided so that metallic hub 21 provided at the center of magnetic disc 3 is exposed to the outside of the cartridge. Hub 21 is engagable with a turntable within the PC so that disc 3 may be rotated. For a further description of the magnetic disc cartridge shown in FIGS. 1–2, see U.S. Pat. No. 5,121,380 the disclosure of which is incorporated herein by reference.

In view of the above, it is apparent that there exists a need in the art for a more efficient and simpler apparatus/method for limiting the number of copies which may be made of software originally stored in a magnetic disc cartridge. The need exists for a system which completely erases or destroys the software after a predetermined number of copies have been made, thereby absolutely preventing further copying from the original magnetic disc. Furthermore, there exists a need in the art to render the copied version of the software noncopyable in the future (e.g. via a software code inserted into or copied onto the copied disc with the software).

SUMMARY OF THE INVENTION

This invention will now be described with respect to certain embodiments thereof, accompanied by certain illustrations wherein:

This invention fulfills the above-described needs in the art by providing a method of limiting the number of copies which may be made of software stored on a first magnetic or magneto-optical disc, the method comprising the steps of:

inserting a disc cartridge into a computer for copying of the software stored on the first magnetic disc, the cartridge rotatably encasing the first disc;

copying the software from the first disc onto a second disc along with an anti-copy signal which prohibits subsequent copying of the copied software from the second disc; and creating an erasing magnetic field proximate the first disc using a magnet mounted on the cartridge thereby erasing the software from the first disc so as to limit the number of copies that may be made of the software.

This invention further fulfills the above-described needs in the art by providing a method of erasing software from the disc when an incorrect password is entered by a user a predetermined number of consecutive times, the method comprising the steps of:

requesting a user to answer a preprogrammed or preset password upon the user requesting copying or access to software stored on the disc;

determining whether the password entered by the user following the requesting step is correct; and erasing the software from the disc when an incorrect password is entered by the user a predetermined number of consecutive times.

This invention still further fulfills the abovedescribed needs in the art by providing a method of limiting the number of copies which may be made of software stored on a magneto-optical or magnetic disc, the method comprising the steps of:

inserting the disc into a computer for copying of the software stored on the disc, the disc being rotatably received by the computer by way of a driven spindle and corresponding driving means for rotating the disc within the computers;

copying the software from the disc onto another disc or into a memory;

providing a conductive magnetic field generating member embedded within the body of the disc; and energizing the conductive member embedded within the disc so as to create a magnetic field for erasing the software from the disc, after the software has been copied.

This invention further fulfills the above-described needs in the art by providing a magnetic or a magneto-optical disc, including a magnetic field generating member embedded therein for the purpose of erasing software from the disc after it has been copied.

IN THE DRAWINGS

DETAILED DESCRIPTION OF CERTAIN EMBODIMENTS OF THIS INVENTION

Figure 1:
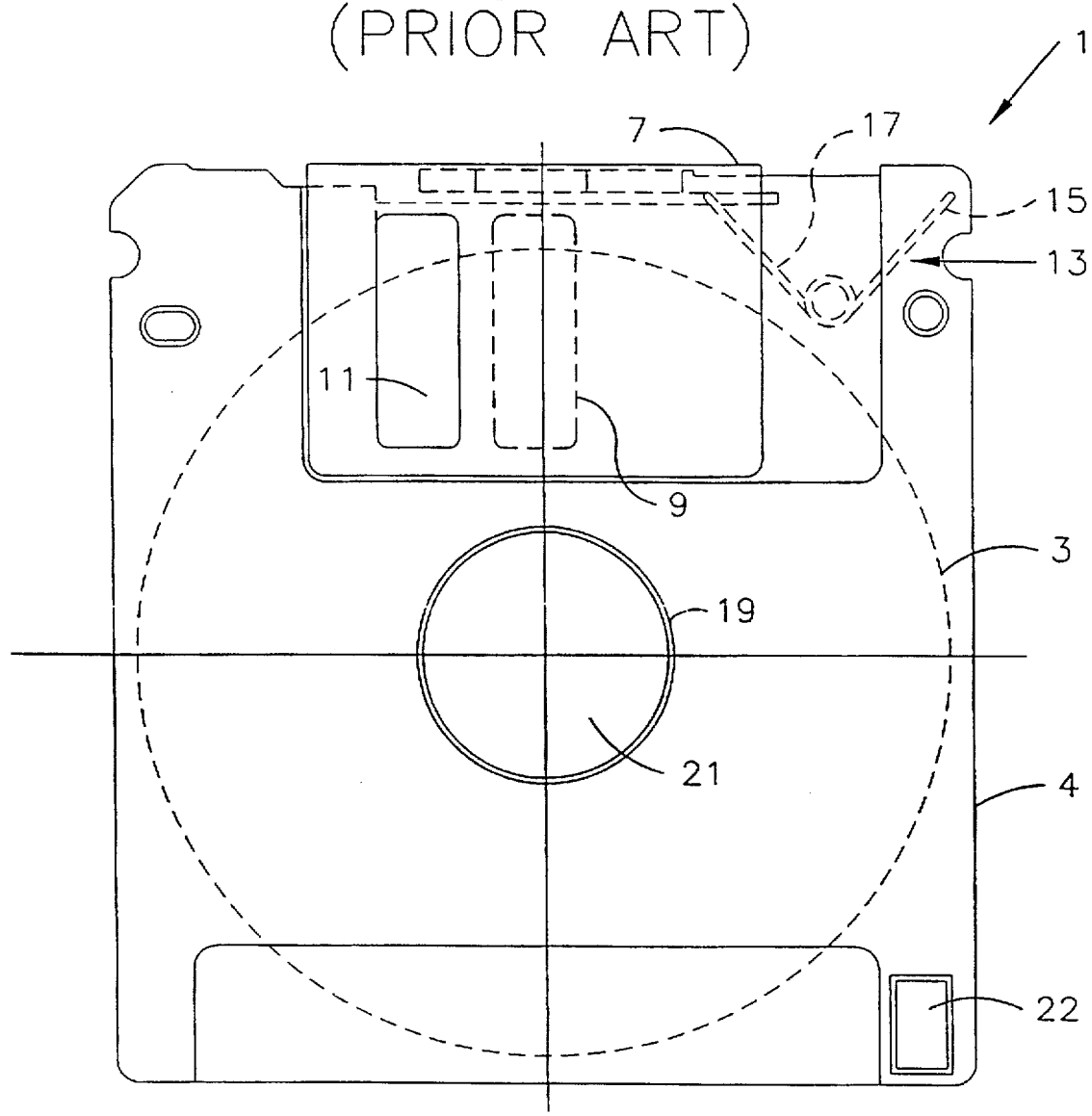
FIG. 1 is a top elevational view of a prior art disc cartridge housing a magnetic disc, the cartridge including a shutter for opening and closing the head insert opening(s) defined in the cartridge case.
Figure 2:
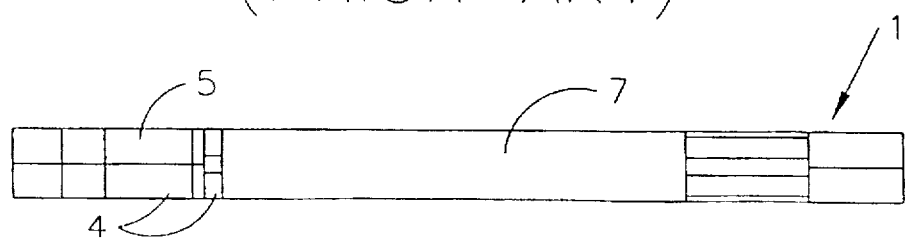
FIG. 2 is a prior art front elevational view of the disc cartridge of prior art FIG. 1.

Referring now more particularly to the accompanying drawings in which like reference numerals indicate like parts throughout the several views.

Figure 3:
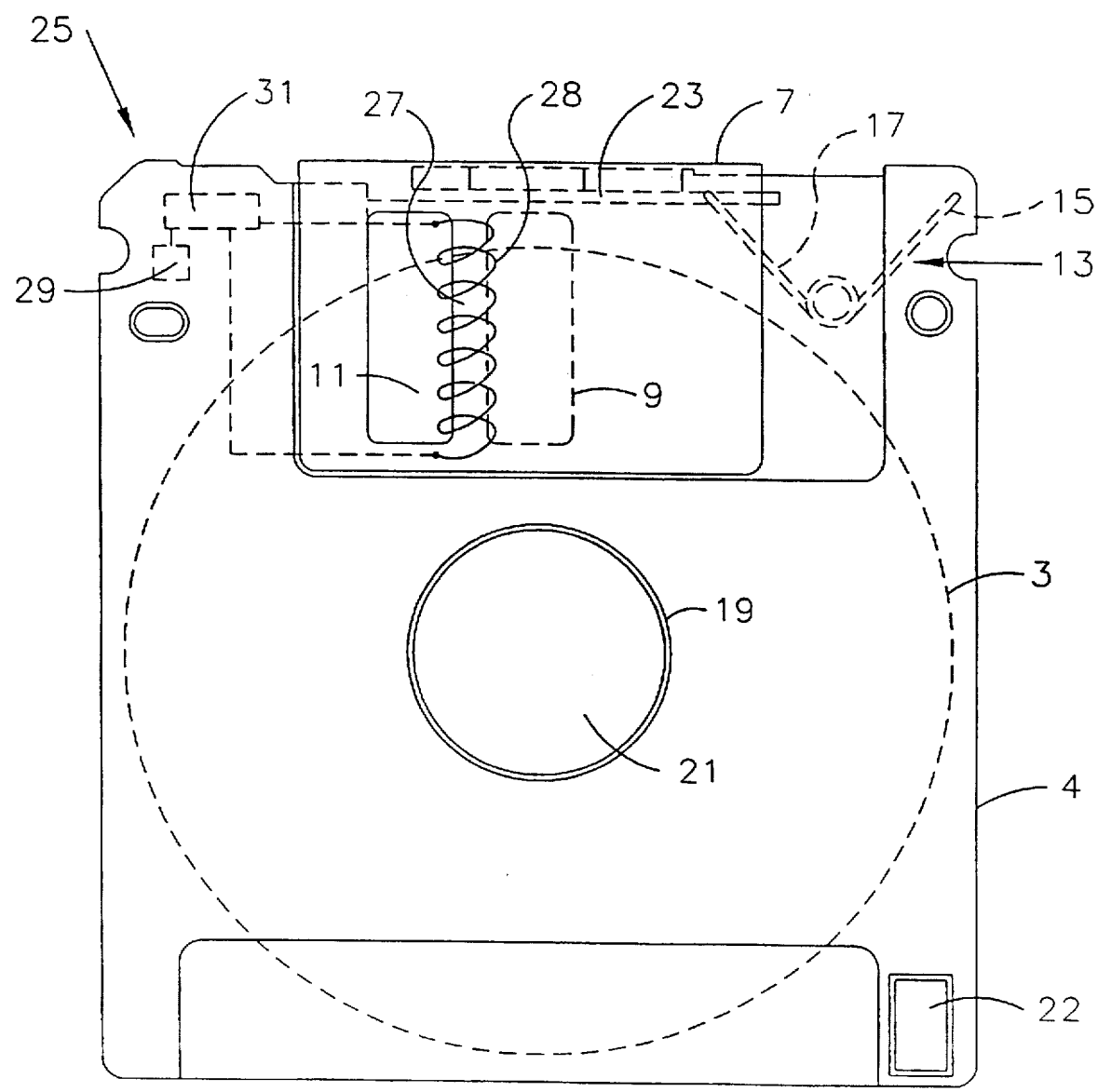
FIG. 3 is a top elevational view of a disc cartridge housing and rotatably encasing a magnetic disc according to a first embodiment of this invention wherein a coil and electromagnet are connected to the shutter of the cartridge.

FIG. 3 is a top elevational view of magnetic disc cartridge 25 according to a first embodiment of this invention. As discussed above, disc cartridge 25 includes upper case half or housing portion 4, rotatably mounted magnetic disc 3, slidable shutter 7 for opening and closing head insert opening 9 upon insertion and removal of cartridge 25 into and from a conventional computer respectively, rectangular aperture 11 defined in shutter 7, biasing spring 13 for urging shutter 7 into the closed position outside of the computer as shown in FIG. 3, central opening 19, central metallic hub 21 affixed to disc 3, rectangular light protector opening 22 which is optional depending upon the type of disc used, and slit or shutter sliding groove 23.

Additionally, magnetic disc cartridge 25 as shown in FIG. 3 includes electromagnet 27 which is formed as a portion of shutter 7, control circuit 29 optionally located within the cartridge, and battery 31 also disposed within the cartridge. Electromagnet 27, formed as a portion of shutter 7 adjacent opening 11 according to certain embodiments, is affixed to shutter 7 and is slidable across cartridge housing 4, 5 therewith, and is provided for establishing an erasing electromagnetic field across at least a portion of magnetic disc 3 which is carried on hub 21. Coil 28 of electromagnet 27 is disposed in close spaced relationship proximate or adjacent the information carrying side of magnetic disc 3 so that the electromagnetic field generated by magnet 27 and coil 28 erases or destroys the data (e.g. computer program or software) stored on disc 3 in a magnetic manner when hub 21 and disc 3 are rotated within the cartridge. Coil 28 is wound around magnet 27. Holes may be provided in the shutter adjacent the magnet 27 portion for allowing coil 28 to be wound around the magnet in a conventional manner. Electromagnet 27 is operated or actuated by control circuit 29 on either AC or DC power, depending upon the particular condition. In other embodiments, other types of known magnets may be provided in a similar location for creating an erasing field.

Storage battery 31 is provided on or within (preferably within) cartridge 25 and provides DC potential. Optionally, battery 31 is continually charged by a charger which is in turn powered by AC electricity directed to the system from an external source located, for example, in the computer housing. According to certain other embodiments, battery 31 need not be continually charged, but may stand alone as long as it may function to energize electromagnet 27 via the coil.

Control circuit 29 is provided for sending a turn-on or energize signal to battery 31 when the software on disc 3 has been copied a predetermined number of times (e.g. one) so that battery 31 can energize coil 28 thereby erasing the software from disc 3.

Figure 4:
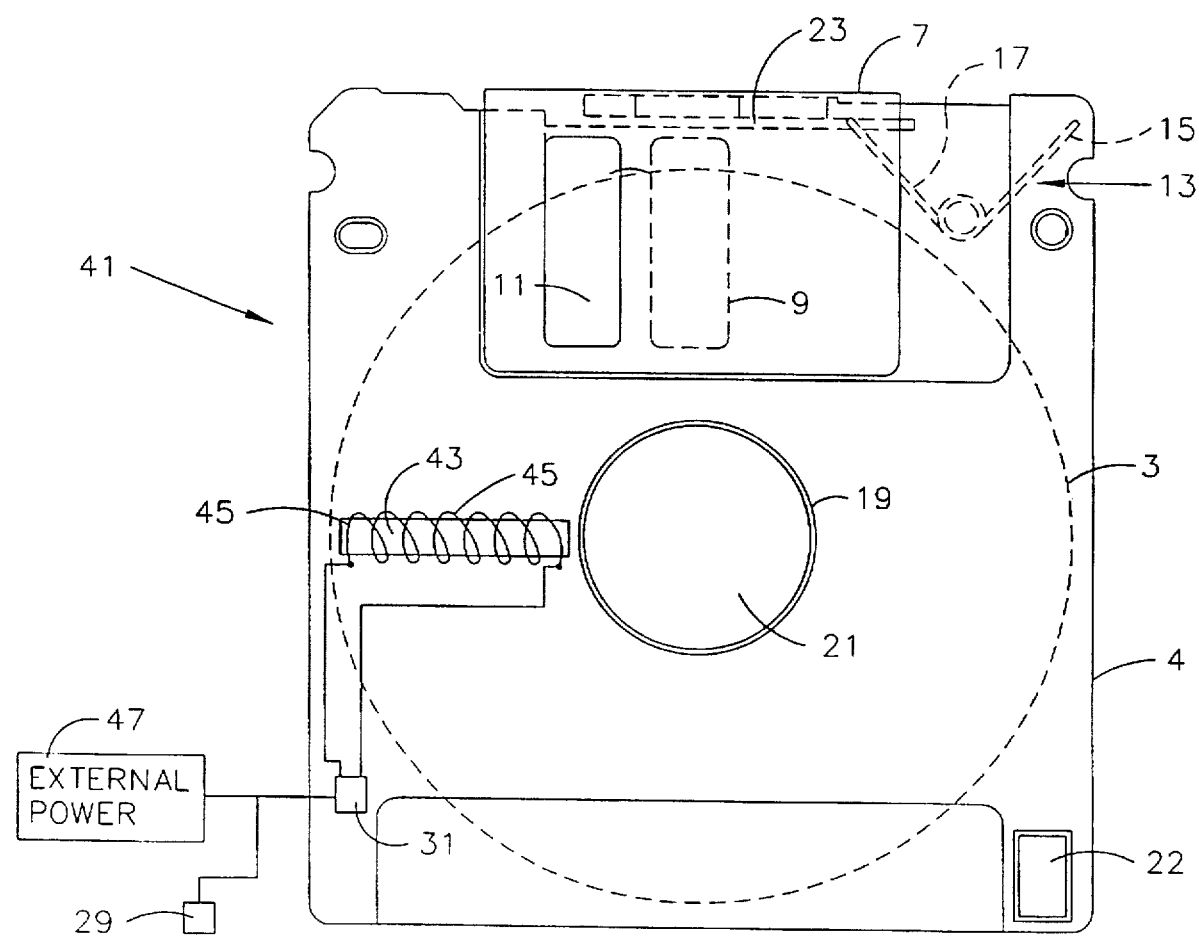
FIG. 4 is a top elevational view of a magnetic disc cartridge according to a second embodiment of this invention wherein the coil and magnet are mounted on or within the cartridge body proximate the encased magnetic disc.

FIG. 4 is a top elevational view of magnetic disc cartridge 41 according to a second embodiment of this invention. Disc cartridge 41 according to this embodiment is similar to the FIG. 3 cartridge except that electromagnet 43 and coil 45 are provided either 1) within the disc cartridge rotated about hub 21 about 90° from shutter 7; or 2) affixed to the exterior or top of disc cartridge portion 4 in this embodiment. When magnet 43 and coil 45 are provided within or inside of disc cartridge 41 proximate the software or data containing side of magnetic disc 3, cartridge 41 is made rather compact in nature with the magnet being provided in such a position for erasing software from disc 3 after it has been copied a predetermined number of times. In the FIG. 4 embodiment, DC battery 31 is also located either inside of or alternatively affixed to the exterior of the disc cartridge, with battery 31 being in communication with coil 45.

Control circuit 29 is also in communication with battery 31 and coil 45 in the FIG. 4 embodiment, with control circuit 29 being located either exterior the disc cartridge at a position within the computer housing, for example, or interior cartridge 41. Optionally, external AC power source 47 may be in communication with control circuit 29 and battery 31. As in the previous embodiment, an electromagnetic field is generated by magnet 43 and coil 45 proximate disc 3 as the coil is energized by either DC or AC power as discussed above. By locating magnet 43 within the disc cartridge remote from shutter 7 in the FIG. 4 embodiment, the structure is substantially simpler in nature and problems associated with sliding of the shutter are not experienced. As with the FIG. 3 embodiment, control circuit 29 is in communication with battery 31 for the purpose of providing a turn-on or energizing signal thereto after software on disc 3 had been copied a predetermined number of times. After receiving such a signal from control circuit 29, battery 31 energizes coil 45 thereby causing an erasing magnetic field to be created proximate disc 3. Circuit 29, sends out such a energizing signal to battery 31 upon receiving a signal originating either in cartridge 41 or within the computer indicating that the software on disc 3 has been copied a predetermined number of times (i.e. one).

Figure 5:
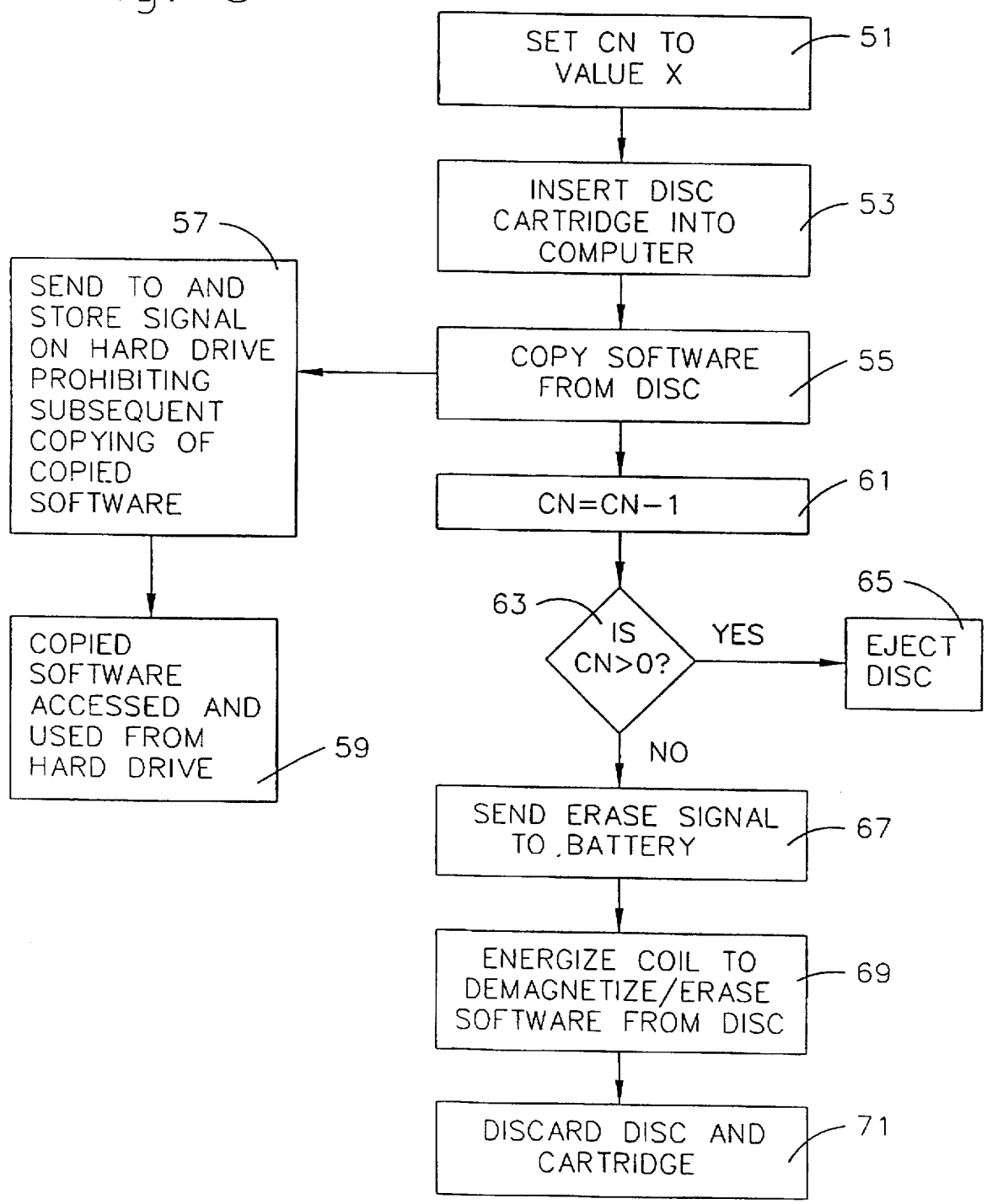
FIG. 5 is a block diagram/flow chart of the system or method according to both the first and second embodiments of this invention.

FIG. 5 is a block diagram/flow chart illustrating the steps taken in order to erase or destroy the software from magnetic disc 3 after it has been copied a predetermined number of times according to certain embodiments of this invention. To begin with, in step 51, a copy number value CN is set to a numeric value (an integer) X equal to one less than the number of copies permitted to be made. Thus, for example, if it is desirable that only one copy be permitted to be made of the software on disc 3, then the CN value is set to 0. Likewise, if it is desired that five copies be permitted to be made of the software on disc 3, then CN is set to 4.

After the CN value is set in step 51, the disc cartridge (25 or 41) including the magnetic disc 3 on which the software is stored is loaded into a conventional computer in a conventional manner in step 53. Such loading causes head insert opening 9 and shutter opening 11 to become aligned. After loading, in step 55, a user manipulates the PC to copy, for example, the program or software on disc 3 onto the PC hard drive. Along with the copying in step 55 of the software program, an anti-copy software signal is copied along with the program onto the hard drive as part of the software as indicated in step 57, this additional anti-copy signal which is copied acting to prohibit future copying of the software now stored on the hard drive. The additional anti-copy signal of step 57 is conventional in nature and is known in the art. Thereafter, the copied program or software may be accessed and used from the computer hard drive as shown in step 59 but is prevented from being copied therefrom by the anti-copy signal sent and stored in step 57.

After the software has been copied in step 55 and the anti-copy signal has been sent or copied therewith in step 57, the CN value is lowered by one as shown in step 61. In other words, the new CN value is equal to the old CN value minus one. Then, in step 63, it is determined whether the new CN value is greater than 0. If the new CN value set in step 61 is determined in step 63 to be greater than 0, than the disc cartridge along with disc 3 is ejected from the computer in a conventional manner as set forth in step 65. However, if the new CN value set in step 61 is found to be equal to 0 (or less than 0) then an erase or destroy signal is sent to control circuit 29 (and battery 31) as set forth in step 67. This signal is sent to control circuit 29 (or directly to battery 31) in either a wireless or a wired communication link manner.

For example, software stored on disc 3 may automatically cause the PC being utilized to send an infrared or RF signal to control circuit 29 which functions as an erase signal so that subsequent thereto control circuit 29 sends an erase signal to battery 31 which causes it to energize the coil and electromagnet thereby creating an erasing electromagnetic field proximate the disc. Alternatively, a signal generating means may be provided within the disc cartridge itself which automatically sends an erase signal to either circuit 29 or battery 31 in a wireless or wired link manner upon copying of software stored on disc 3 (when CN≦0). In either case, the erase signal sent in step 67 causes the coil surrounding the magnet to be energized in step 69. Because the electromagnet is located or disposed proximate the information side of disc 3, the electromagnetic field created by the electromagnet erases or destroys the copied software in step 69. After this erasure, the disc cartridge is ejected and may be discarded or reused in certain embodiments as set forth in step 71.

Figure 6:
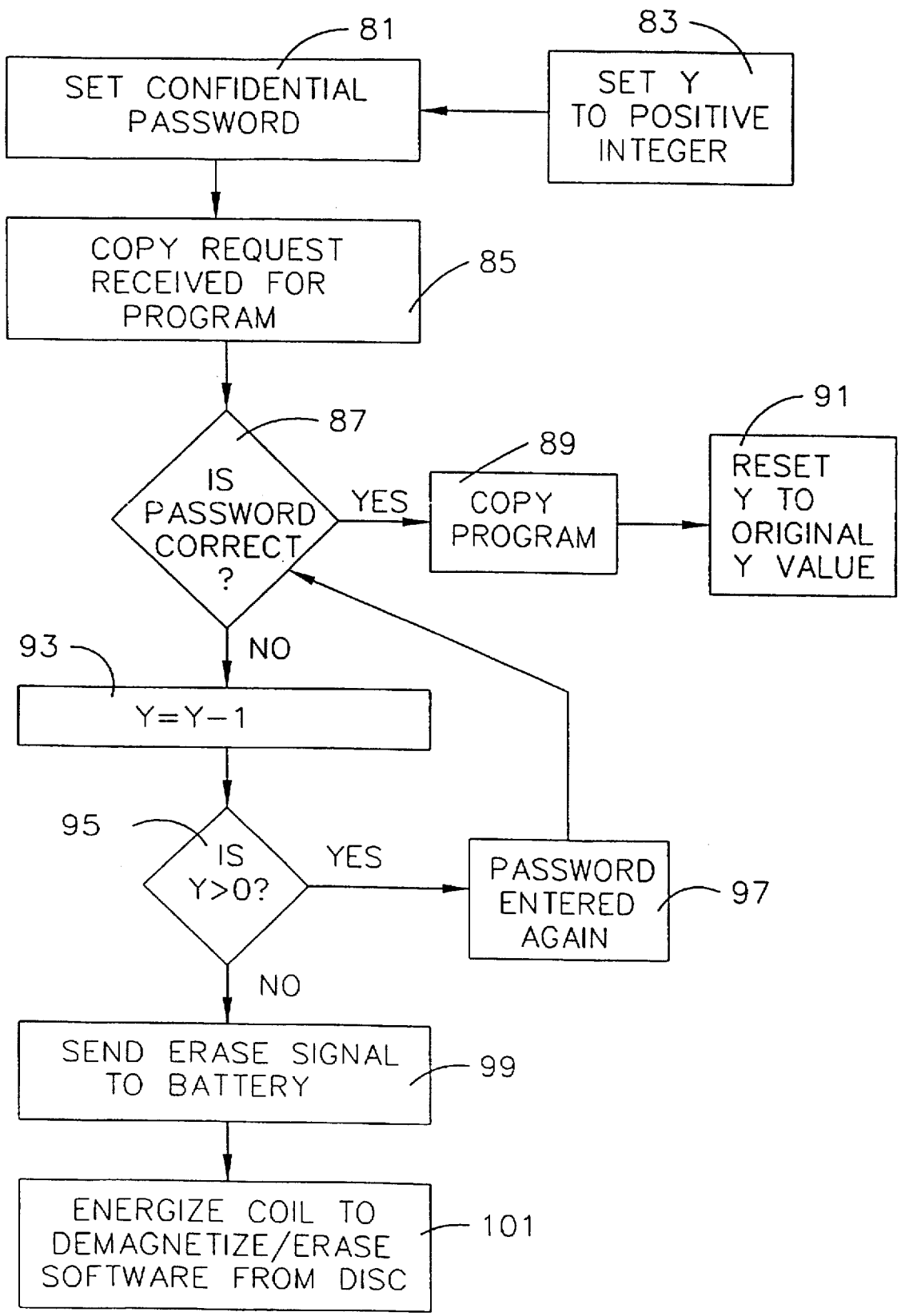
FIG. 6 is a block diagram/flow chart of a system and method according to yet another embodiment of this invention in which software is erased from a disc following a predetermined number of unsuccessful consecutive access attempts wherein this embodiment may utilize the disc cartridge of either FIG. 3 or FIG. 4 in implementing erasure.

FIG. 6 is a block diagram/flow chart of a system and method according to another embodiment of this invention where the disc cartridge of either FIG. 3 or FIG. 4 is used to erase software from disc 3 following a predetermined number of unauthorized and consecutive access attempts. The system and method according to this embodiment are as follows. To start with, in step 81, a password is set, this password only being known by authorized users of the software stored on disc 3. As indicated in step 83, the value Y is set to a positive integer equal to the number of unauthorized consecutive access attempts to be permitted before the software is automatically erased. Thus, for example, Y is set to the number 5 in step 83 if the user of the system which is the software to be erased after five consecutive unauthorized access attempts.

In step 85, a user attempts to access the software stored on disc 3, located in the PC. In step 87, it is determined whether or not the password entered by the user is correct. If the user is found to have, in fact, entered the correct password in step 87, then the program or software becomes both accessible and may be copied as indicated in step 89 and the Y value is reset to its original value of step 83. This resetting of the Y value is indicated in step 91.

When it is determined in step 87 that the user has entered an incorrect password, then the Y value is changed in step 93 so that the new Y value is equal to the previous Y value minus one. Thus, for example, if the Y value is set to 5 in step 83 and an incorrect password was entered by the user, then the new Y value set in step 93 is 4 as 4 is equal to 5−1.

After the new Y value is set in step 93, it is determined in step 95 if the new Y value is greater than 0. If the new Y value is found to be greater than 0, then the user is permitted to attempt to access the software again by entering another password as indicated in step 97. However, when it is found that the new Y value is equal to or less than 0 in step 95, and erase signal is sent to battery 31, either by circuit 29 or from another source, as indicated in step 99. As shown in step 101, this erase signal sent to the battery causes the battery to energize the coil surrounding the magnets thereby causing an erasing magnetic field to be generated proximate the disc so as to erase the software. In such a manner, the software or program stored on disc 3 is automatically erased after an unauthorized user attempts to consecutively access the software a predetermined number of times. As will be appreciated by those of skill in the art, such a system and corresponding method act to prevent a user from attempting a plurality of different passwords in an attempt to "figure out" what the authorizing password actually is.

Figure 7:
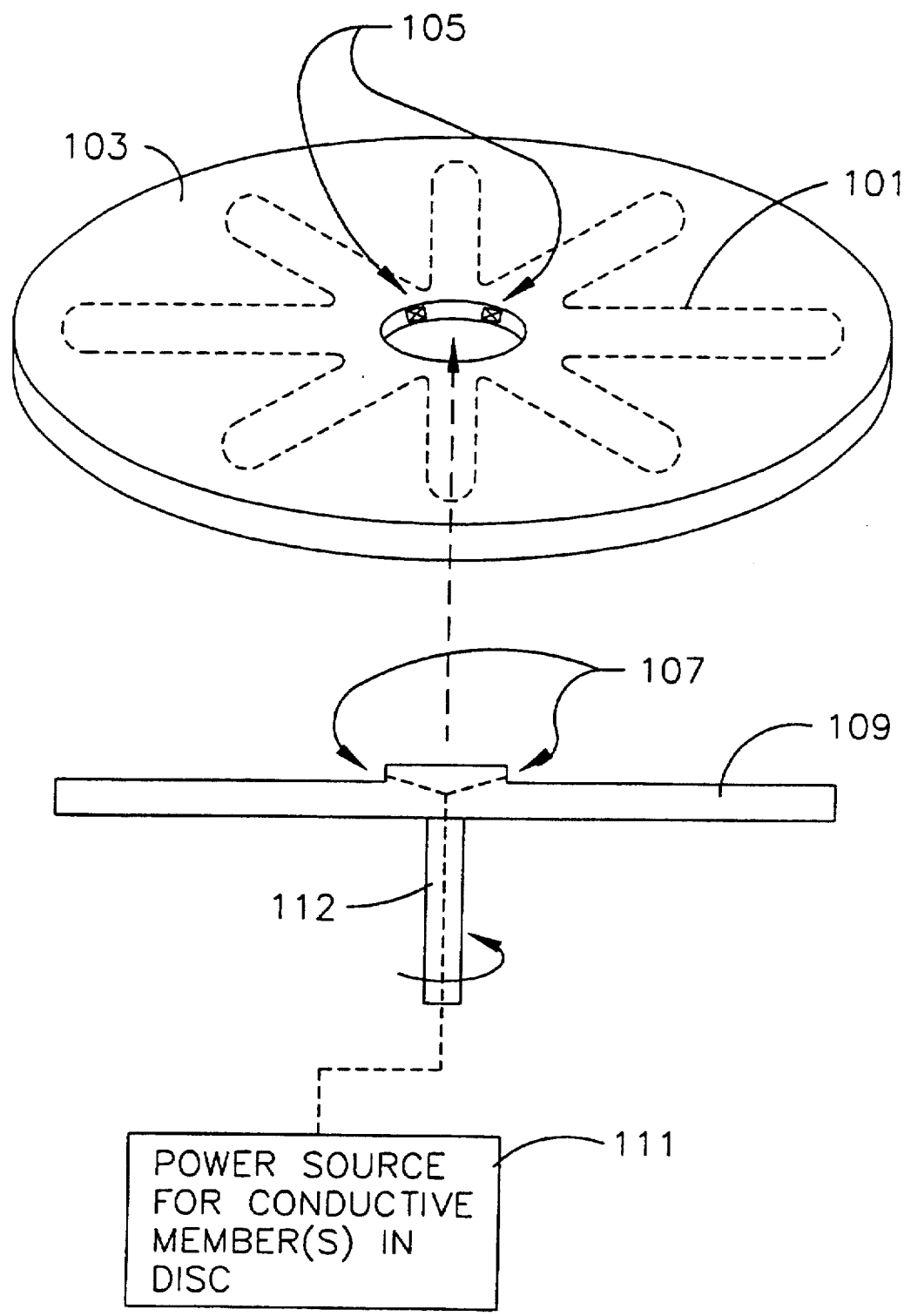
FIG. 7 is a schematic illustrating another embodiment of this invention wherein a conductive magnetic field generating member is embedded within a magneto-optical disc so that when actuated, software on the disc is erased from same.

FIG. 7 is a schematic illustrating another embodiment of this invention. As illustrated in FIG. 7, electromagnetic member 101 is embedded within magneto-optical or magnetic disc 103. When embedded member 101 (e.g. coil) is energized by way of terminals 105, an erasing magnetic field is generated from conductive member 101 for the purpose of erasing software from disc 103 after it has been copied to another disc or memory within the computer. Thus, electromagnetic field generating member 101 that is embedded within disc 103 functions in a manner similar to coil 45 discussed above. An electromagnet, of course, may also be provided within is disc 103 so as to enable the erasing field to be generated. Terminals 105 are provided on an exterior surface of disc 103 (e.g. in the spindle area as shown) so as to enable electrical contact with spindle contacts 107 that are provided on driven spindle 109. Thus, when disc 103 is mounted on spindle 109 within a computer or the like, contacts 107 form an electrical connection with terminals 105 thereby allowing current from source 111 to run upward through driving shaft 112, and then from contacts 107 to terminals 105, so as to energize member 101. The result is that software stored on magneto-optical or magnetic disc 103 is erased after it has been copied, when member 101 is energized at step 69, or step 101. Thus, the methods illustrated in FIGS. 5 and 6, and discussed above, are applicable to this FIG. 7 embodiment, so that member 101 (as opposed to coils 28 and 45) is energized in steps 69 and 101 in order to erase copied software from disc 103.

Once given the above disclosure, therefore, various other modifications, features, or improvements will become apparent to the skilled artisan. Such other features, modifications, and improvements are thus considered a part of this invention, the scope of which is to be determined by the following claims.

I claim:

1. A method of erasing software from a magnetic disc when an incorrect password is entered by a user a predetermined number of consecutive times, the method comprising the steps of:

providing the magnetic disc;

providing a disc cartridge within which the magnetic disc is mounted, and providing as part of the cartridge a spring-biased slidable shutter adjacent a head insert opening in the cartridge;

providing an opening in the shutter;

spring-biasing the shutter into a closed position when the disc cartridge and magnetic disc therein are outside of a computer so as to cover the head insert opening in the cartridge;

sliding the shutter and uncovering the head insert opening in the cartridge when the disc cartridge and magnetic disc therein are inserted into a computer;

requesting a user to enter a pre-programmed or preset password upon the user requesting copying or access to software stored on the magnetic disc;

determining whether the password entered by the user following said requesting step is correct; and sending an erasing signal and automatically erasing the software from the magnetic disc when an incorrect password is determined to have been entered by the user a predetermined number of consecutive times.

2. The method of claim 1, wherein said automatically erasing step further includes the step of:

creating a magnetic field proximate the magnetic disc using a magnet mounted on the disc cartridge to perform said erasing.

3. The method of claim 2, wherein said automatically erasing step further includes the step of:

energizing a coil mounted on the cartridge adjacent the magnet thereby creating an electromagnetic field proximate the magnetic disc in order to perform said erasing.

4. The method of claim 1, wherein the predetermined number is from about one to five.

5. The method of claim 1, wherein said automatic erasing step further includes sending an erasing signal to a battery which causes magnetic means mounted on the cartridge to create an erasing magnetic field proximate the magnetic disc and erasing software thereon.

6. The method of claim 5, further providing a coil mounted on the shutter and located adjacent the opening in the shutter, as part of the magnetic means.

7. The method of claim 1, further comprising the steps of (i) performing the operation Y=Y−1 when it is determined that an incorrect password has been entered so that a new Y value after it is determined that an incorrect password has been entered is equal to a previous Y value minus 1, and (ii) permitting the user to attempt to access the software on the disc when it is determined that the new Y value is greater than zero, and (iii) sending an erasing signal to erase the software on the disc when it is determined that the new Y value is equal to or less than zero.

* * * * *